Aug. 7, 1934.  G. M. NELL  1,968,902
CHUCK CONSTRUCTION FOR ROCK DRILLS
Filed Oct. 14, 1931
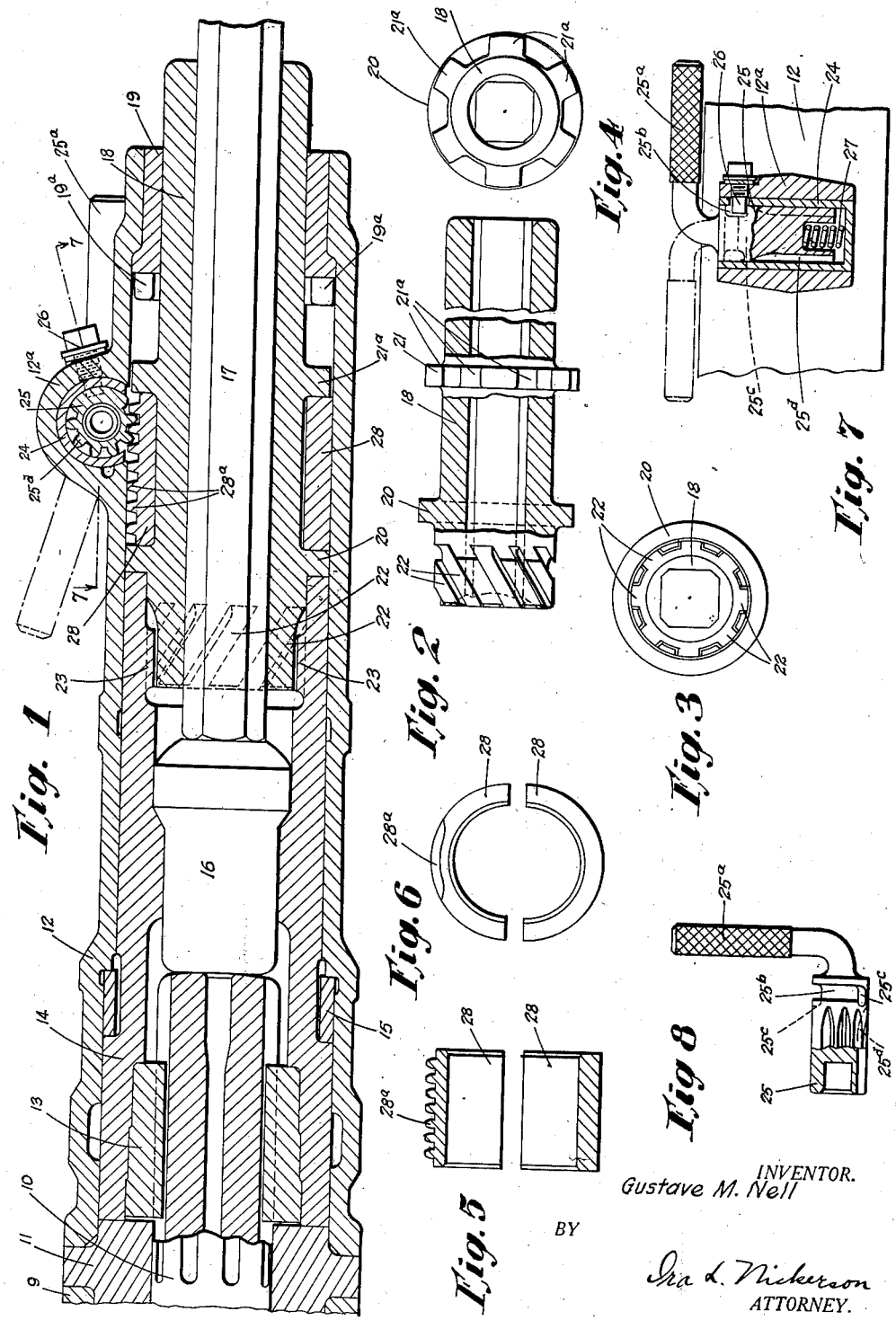
INVENTOR.
Gustave M. Nell
BY
Ira L. Nickerson
ATTORNEY.

Patented Aug. 7, 1934

1,968,902

UNITED STATES PATENT OFFICE 1,968,902

CHUCK CONSTRUCTION FOR ROCK DRILLS

Gustave M. Nell, Detroit, Mich., assignor to Chicago Pneumatic Tool Company, New York, N. Y., a corporation of New Jersey Application October 14, 1931, Serial No. 568,683

2 Claims. (Cl. 121—7)

This invention relates to fluid pressure percussive drilling machines having power feed mechanism for advancing the same to the work and automatically operated rotation mechanism for stepping the drill steel around while it receives the blows of the percussive motor. Such machines are commonly referred to as "self-rotating stopers". More particularly the invention concerns the front head construction and especially the chuck for supporting the drill steel. In certain respects the invention may be considered as an improved form or further development of the inventions disclosed in my copending applications Serial Nos. 437,686 and 437,687 filed March 21, 1930, and issued on November 17, 1931 as Patents 1,832,470 and 1,832,471.

One of the objects of the invention is to provide a chuck having releasable engagement with the rotation mechanism but automatically maintained in engagement during normal drilling. Another object is to enable the rotary driving connection to be interrupted without injury to the chuck parts when the percussive motor delivers a blow to a drill steel while the latter is not in contact with the work. Other objects will be apparent from the detailed description which follows.

In order to illustrate the invention one concrete embodiment thereof is shown in the accompanying drawing, in which:

Fig. 1 is a fragmentary longitudinal sectional view of the front end of a stoping machine showing the chuck mechanism in the normal drill steel rotating position;

Fig. 2 is a side elevational view of the chuck on a reduced scale and partly in section;

Figs. 3 and 4 are respectively left and right end elevational views of the chuck shown in Fig. 2;

Figs. 5 and 6 are respectively longitudinal sectional and end elevational views of the split operating sleeve for the chuck;

Fig. 7 is a fragmentary sectional view substantially on the line 7—7 of Fig. 1; and Fig. 8 is a plan view partly in section of the manual control member.

The illustrated embodiment of the invention discloses only the forward portion of a self-rotated stoping machine, it being understood that the machine has a percussive motor provided with suitable rotating mechanism for the drill steel and a power feed for advancing the machine to the work, such as a pneumatic feed leg. Disclosure of the power feed is omitted entirely since it forms no part of the present invention and only such portions of the percussive motor and of the rotation mechanism thereof, as are essential to the understanding of the invention, are illustrated. The machine has a cylinder 9 within which reciprocates an impact piston 10 only the forward end of which is shown guided in cylinder bushing 11 which is clamped between cylinder 9 and front head 12. The percussive motor may be understood to have the well known rifle bar rotation mechanism for rotating piston 10, the splined forward portion of which is shown extending within front head 12 and cooperating with splined nut 13 secured in any suitable or desired manner within a counterbore in rotative sleeve 14. A thrust ring or bearing member 15 may engage shouldered portions of the interior of front head 12 and the exterior of rotative sleeve 14. The blows of piston 10 are received by an anvil block 16 mounted in sleeve 14 and transmitted by the block to drill steel 17 which is slidably received in chuck 18, the latter having a limited axial movement within front head 12. A renewable bushing 19 is securely fastened in the outer end of front head 12 as by a press fit to provide a bearing for chuck 18 and to form a limiting stop as well as a fixed clutch member.

Chuck 18 is arranged for axial adjustment within front head 12 for clutching engagement either with rotative sleeve 14 or with front head 12. It has spaced stop flanges 20 and 21 and its inner or sleeve engaging end has a portion beyond flange 20 arranged to telescope within sleeve 14. The telescoping portions of chuck 18 and sleeve 14 have cooperating clutch teeth 22, 23 respectively cut at an angle to the axial so as to be formed as spiral splines, the angle of which is such as normally to hold clutch teeth 22 and 23 in engagement. To disengage these clutch teeth, chuck 18 will be moved to the right and partly rotated as the clutch teeth or spiral splines pass out of engagement. When moved to the limit of its outward movement the driving connection with rotative chuck 14 will be broken and chuck 18 will be brought into locking engagement with front head 12 by means of cooperating teeth 21a (formed by slotting or interrupting stop flange 21) and axially extending teeth 19a on bushing 19.

Adjustment of the position of chuck 18 is effected from the exterior of front head 12. To this end a boss 12a is provided on front head 12, the boss being cylindrical as shown in Figs. 1 and 7 and extending transversely of the axis of the drill. Boss 12a has a bore therethrough which intersects and opens into the interior of front head 12 as is clear from Fig. 1. A bushing 24, closed at one end, lines the bore of boss 12a and provides a bearing for member 25, the latter having a bent extension forming an operating handle 25a. Adjacent the open end of bushing 24, member 25 is provided with a slot 25b enlarged at its ends by recesses 25c. Slot 25b receives the inwardly projecting end of a pin 26 which has threaded connection with boss 12a and extends through an opening in bushing 24 whereby the latter is securely held in place by pin 26. Member 25 is yieldingly forced outwardly against pin 26 by a coil spring 27 seated in a recess in its inner end and engaging the closed end of bushing 24. The exterior of member 25 is axially grooved to form teeth 25d whereby member 25 may operate as a pinion. Teeth 25d project within the interior of front head 12 and mesh with rack teeth 28a on one portion of a split sleeve 28 (Figs. 5 and 6) which incloses chuck 18 between flanges 20 and 21 as indicated in Fig. 1.

The manner of use of the invention is as follows. When the operator is ready to start a drill hole he swings handle 25a to the rearward or broken line position shown in Figs. 1 and 4. This action causes the pinion and rack connection between pinion member 25 and split sleeve 28 to move chuck 18 to its forward or outer position whereupon chuck 18 is clutched to front head 12 by the interengagement of teeth 21a on flange 21 with teeth 19a on front head bushing 19. Since there is now no driving connection between rotative sleeve 14 and chuck 18, sleeve 14 is free to rotate without imparting rotation to the chuck and the operator can use the stoping machine for hole starting in exactly the same manner as the conventional hand-rotated stoper, oscillating or rocking the entire machine to secure rotative movement of the drill steel. When the hole has been "collared" to a sufficient depth to support the drilling machine, he moves pinion handle 25a to the forward or running position shown in Figs. 1 and 4. This forces chuck 18 rearwardly to cause spiral splines 22 and 23 to mesh and establish a driving connection between rotative sleeve 14 and chuck 18. The machine will then operate as a self-rotating stoper since chuck 18 and drill steel 17 supported thereby will be rotated by the rotation mechanism which includes sleeve 14.

Chuck 18 will be yieldingly retained in both its forward and rearward positions through the operation of spring 27 which urges member 25 outwardly and causes pin 26 to seat in recesses 25c. This construction acts as a safety feature when the percussive machine is operated while drill steel 17 is out of contact with anvil block 16. In such a case, the blow of piston 10 is transmitted by block 16 to chuck 18. By reason of the yielding latching arrangement, chuck 18 can move forward under the blow since the cam effect produced on pin 26 by rotation of member 25 will force member 25 inwardly and rotation of member 25 may continue since pin 26 will then be in line with slot 25b. Thus splines 22 and 23 can disengage under a heavy blow without breaking the splines or stripping teeth 28a and 25d of the rack and pinion mechanism. On the other hand the parts will be held in proper relative positions under the shock and vibration of normal drilling.

From the above it will be apparent that by the provision of spiral flutes forming the driving connection between rotative sleeve 14 and chuck 18, these parts are normally held in proper rotating position while permitting forward, manual, disengaging movement of the chuck, and engagement of the chuck with the front head lugs while the drill is running, and that the resilient camming means permitting release of the driving connection when the hammer blow is received by chuck 18 prevents accidental damage to the operating parts including the rack and pinion teeth.

I claim as my invention:

1. In a percussive drilling machine, a front head, a rotative sleeve in said front head, a chuck in said front head in line with said sleeve for supporting a drill steel, said chuck having limited axial movement within said front head, axially spaced radial flanges on the exterior of said chuck, said flanges being engageable alternately and respectively with the rotative sleeve and front head, a split sleeve engaging said chuck between said flanges, a manually actuated member on the exterior of said front head, and an operated connection between said member and said split sleeve whereby said chuck may be adjusted toward and from said rotative sleeve.

2. In a percussive drilling machine, a front head, a rotative sleeve in said front head, a chuck in said front head in line with said sleeve for supporting a drill steel, said chuck having limited axial movement within said front head, axially spaced radial flanges on the exterior of said chuck, means for adjusting the position of said chuck including a member mounted on said chuck between said flanges, adjacent ends of said chuck and of said sleeve being arranged for telescoping engagement, cooperating clutch teeth on said ends, said teeth being inclined at an angle to the axial so as to offer resistance to declutching movement of said chuck, cooperating clutch teeth on said chuck and on said front head for engagement when said chuck is moved to break the connection with said sleeve, one of the flanges on said chuck being cut away at intervals to provide a portion of said last-named teeth.

GUSTAVE M. NELL.

CERTIFICATE OF CORRECTION.

Patent No. 1,968,902. August 7, 1934.

GUSTAVE M. NELL.

It is hereby certified that error appears in the printed specification of the above numbered patent requiring correction as follows: Page 2, line 111, claim 1, for "operated" read operating; and that the said Letters Patent should be read with this correction therein that the same may conform to the record of the case in the Patent Office.

Signed and sealed this 11th day of September, A. D. 1934.

Leslie Frazer (Seal) Acting Commissioner of Patents.